(12) United States Patent
Gao et al.

(10) Patent No.: US 11,269,530 B2
(45) Date of Patent: Mar. 8, 2022

(54) METHOD FOR STORAGE MANAGEMENT, ELECTRONIC DEVICE AND COMPUTER PROGRAM PRODUCT

(71) Applicant: EMC IP Holding Company LLC, Hopkinton, MA (US)

(72) Inventors: Jian Gao, Beijing (CN); Jibing Dong, Beijing (CN); Geng Han, Beijing (CN); Jianbin Kang, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/936,732

(22) Filed: Jul. 23, 2020

(65) Prior Publication Data

US 2021/0216208 A1    Jul. 15, 2021

(30) Foreign Application Priority Data

Jan. 15, 2020 (CN) .......................... 202010044193.6

(51) Int. Cl.
*G06F 3/06* (2006.01)

(52) U.S. Cl.
CPC ............ *G06F 3/064* (2013.01); *G06F 3/0619* (2013.01); *G06F 3/0631* (2013.01); *G06F 3/0644* (2013.01); *G06F 3/0689* (2013.01)

(58) Field of Classification Search
None
See application file for complete search history.

(56) References Cited

U.S. PATENT DOCUMENTS

| 9,594,652 | B1* | 3/2017 | Sathiamoorthy ... G06F 11/1092 |
| 10,126,988 | B1* | 11/2018 | Han ..................... G06F 3/0619 |
| 10,140,041 | B1* | 11/2018 | Dong ................... G06F 3/0619 |
| 10,146,447 | B1* | 12/2018 | Dong .................. G06F 11/1076 |
| 10,146,459 | B1 | 12/2018 | Gao et al. |
| 10,146,624 | B1 | 12/2018 | Gong et al. |
| 10,152,254 | B1 | 12/2018 | Kang et al. |
| 10,296,252 | B1* | 5/2019 | Han ..................... G06F 3/0619 |
| 10,318,169 | B2 | 6/2019 | Dalmatov et al. |
| 10,552,078 | B2 | 2/2020 | Gong et al. |
| 10,592,111 | B1 | 3/2020 | Wang et al. |
| 10,678,643 | B1 | 6/2020 | Gao et al. |
| 2015/0178004 | A1* | 6/2015 | Xu ........................ G06F 3/0665 |
| | | | 711/114 |
| 2019/0220357 | A1* | 7/2019 | Han ..................... G06F 3/0619 |
| 2021/0216230 | A1 | 7/2021 | Dalmatov et al. |
| 2021/0286529 | A1 | 9/2021 | Dalmatov et al. |

* cited by examiner

*Primary Examiner* — Kaushikkumar M Patel
(74) *Attorney, Agent, or Firm* — BainwoodHuang

(57) ABSTRACT

Techniques for storage management involve determining an independent redundant disk array RAID associated with a first set of storage disks, a first portion of storage blocks corresponding to the RAID being located in the first set of storage disks; determining, from the first set of storage disks, a plurality of storage disks corresponding to the RAID; and updating a set of association degrees of the first set of storage disks to indicate data coupling between storage disk pairs in the plurality of storage disks. Accordingly, the data coupling degree between storage disks can be determined more accurately.

17 Claims, 4 Drawing Sheets

METHOD FOR STORAGE MANAGEMENT, ELECTRONIC DEVICE AND COMPUTER PROGRAM PRODUCT

CROSS-REFERENCE TO RELATED APPLICATION

This application claims priority to Chinese Patent Application No. CN202010044193.6, on file at the China National Intellectual Property Administration (CNIPA), having a filing date of Jan. 15, 2020, and having "METHOD FOR STORAGE MANAGEMENT, ELECTRONIC DEVICE AND COMPUTER PROGRAM PRODUCT" as a title, the contents and teachings of which are herein incorporated by reference in their entirety.

FIELD

Embodiments of the present disclosure generally relate to the field of computer, and more specifically, to a method, a device and a computer program product for storage management.

BACKGROUND

In a storage system based on a redundant array of independent disks (RAID), if one storage disk fails, the storage system can recover the data in the failed disk by utilizing the data in other storage disks. However, it is still possible that multiple storage disks fail at the same time. Such a failure may cause some data to be lost and cannot be effectively recovered. Therefore, how to reduce the risk brought by the failure of the storage disk has become a current focus of attention.

SUMMARY

Embodiments of the present disclosure provide a scheme for storage management.

In a first aspect of the present disclosure, there is provided a method for storage management. The method includes determining an independent redundant disk array RAID associated with a first set of storage disks, a first portion of storage blocks corresponding to the RAID being located in the first set of storage disks; determining, from the first set of storage disks, a plurality of storage disks corresponding to the RAID; and updating a set of association degrees of the first set of storage disks to indicate data coupling between storage disk pairs in the plurality of storage disks.

In a second aspect of the present disclosure, there is provided a device for storage management. The device includes at least one processing unit and at least one memory. The at least one memory is coupled to the at least one processing unit and stores instructions for execution by the at least one processing unit. The instructions, when executed by the at least one processing unit, cause the device to perform acts including: determining an independent redundant disk array RAID associated with a first set of storage disks, a first portion of storage blocks corresponding to the RAID being located in the first set of storage disks; determining, from the first set of storage disks, a plurality of storage disks corresponding to the RAID; and updating a set of association degrees of the first set of storage disks to indicate data coupling between storage disk pairs in the plurality of storage disks.

In a third aspect of the present disclosure, there is provided a computer program product being tangibly stored on a non-transitory computer-readable medium and including machine-executable instructions which, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION OF EMBODIMENTS

Figure 1:
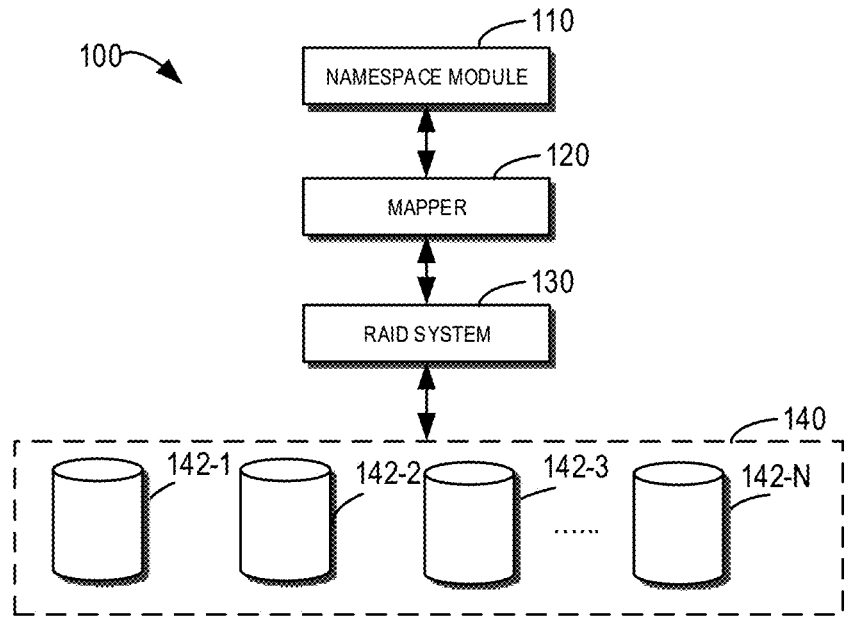
FIG. 1 illustrates a schematic diagram of an example storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to same or different objects. The following text also can include other explicit and implicit definitions.

Example Storage System

In a RAID-based storage system, a RAID can include storage blocks from a plurality of storage disks, and a plurality of storage disks can form a plurality of independent RAIDs. In the RAID-based data recovery process, other storage blocks in the same RAID can be used to recover the data of the target storage block. In order to reduce the risk of storage disk failure as much as possible, it is desirable for the RAID-based storage system that the storage blocks in a plurality of RAIDs be evenly distributed to each storage disk so that the impact of a storage disk failure is minimized. However, when a garbage collection operation is performed on the storage system or when a new storage disk is added to the storage system, the distribution of a plurality of RAID storage blocks in the storage system may be uneven.

In view of the above problems and other potential problems, a storage management solution according to the embodiments of the present disclosure is proposed. By maintaining a corresponding degree of association for each set of storage disks, the degree of usage balance in the set of storage disks can be better indicated.

In order to better understand the process of storage management according to an embodiment of the present disclosure, the basic architecture of a RAID-based storage system will be first introduced as follows.

FIG. 1 illustrates a schematic diagram of an example storage system 100 in which embodiments of the present disclosure can be implemented. As shown in FIG. 1, the storage system 100 includes a hardware storage pool 140, which includes a plurality of storage disks 142-1, 142-2, 142-3, . . . , 142-N (N is an integer greater than or equal to 1), and the like, for providing the physical storage space for the storage system 100. For the purpose of discussion, these storage disks are sometimes referred to as storage disks 142 collectively or individually. The storage disk 142 may include various types of storage-capable devices, including but not limited to, a hard disk (HDD), a solid state disk (SSD), a removable disk, a compact disk (CD), a laser disk, an optical disc, a digital multi-function disk (DVD), a floppy disk, a blu-ray disc, a serial attached small computer system interface (SCSI) storage disk (SAS), a serial advanced technology attached (SATA) storage disk, any other magnetic storage device, and any other optical storage equipment, or any combination thereof.

The RAID system 130 in the storage system 100 is built on the plurality of storage disks 142 to organize the physical storage space of the storage disks 142 using a RAID algorithm. The RAID system 130 provides a flat physical address space to the mapper 120 of the storage space 100. The mapper 120 is configured to manage the mapping between physical and logical addresses of the storage system 100. The mapper 120 provides the flat linear logical address space to a namespace module (or component) 110. The namespace module 110 utilizes the logical address space provided by the mapper, and may call the application program interface (API) of the mapper 120 to obtain the mapping of logical to physical addresses. When performing an I/O operation on the storage system 100, an I/O request from a user is received by the namespace module 110 and sent to the mapper 120. The mapper 120 looks up the physical address of the data targeted by the I/O request (the address to which the data is written or the address from which the data is read), and initiates the I/O to the RAID system 130 such that the RAID system 130 performs actual I/O operations to the back-end storage disk.

It should be appreciated that FIG. 1 only schematically shows units, modules, or components (e.g., specialized circuitry) in the storage system 100 associated with the embodiments of the present disclosure. Each component shown in FIG. 1 is only an example storage system management architecture. In other RAID-based storage systems, there may be other architectural divisions, other units, modules, or components for other functions, and so on. Therefore, the embodiments of the present disclosure are not limited to the specific devices, units, modules, or components depicted in FIG. 1, but are generally applicable to any RAID-based storage system.

Figure 2:
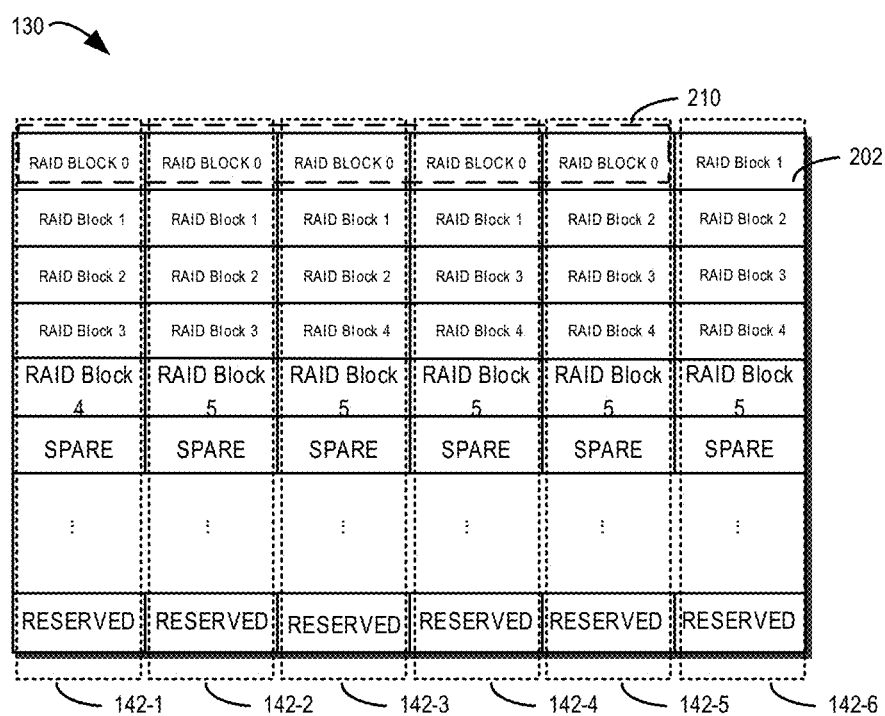
FIG. 2 illustrates a schematic diagram of RAID formed by a plurality of storage blocks from a plurality of storage disks according to an embodiment of the present disclosure.

In RAID-based storage systems, various RAID algorithms can be used to organize the physical storage disks 142, including conventional RAID algorithms and the architecture currently known as RAID 2.0. To better understand the RAID-based storage system, FIG. 2 shows an example structure of the RAID system 130. As shown in FIG. 2, the storage disk 142 is divided into a plurality of disk extents or a plurality of disk slices 202. Such a division may be a logical division. The size of the disk extent 202 depends on the size of storage disk and the division method. In some examples, the size of the disk extent 202 may be in the gigabyte (gigabyte) level. Of course, other sizes are also possible according to actual deployment needs.

The RAID system 130 is constructed in units of disk extents 202. In some dynamically allocated storage systems, when the RAID system 130 is initially created, all disk extents are free. As data is written, when the capacity of the RAID is found to be insufficient, the RAID system 130 will use a certain algorithm to select a plurality of disk extents 202 from different storage disks 142, and constitute these disk extents 202 as the RAID blocks 210 of the RAID system 130. Such RAID blocks 210 may be considered as a small RAID because I/O access and management of the RAID block 210 is similar to that of the conventional RAID.

The disk extents 202 may be selected from the plurality of storage disks 142 in any suitable algorithm, such as a Round-Robin algorithm, a weighted round-robin distribution algorithm, and the like. The number of disk extents included in each RAID 210 depends on the type of RAID, so as to provide different levels of data redundancy and recovery capabilities. The types of RAID include RAID 2, RAID 3, RAID 4, RAID 5, RAID 6, RAID 7, RAID 10, and so on. In FIG. 2 and below, for the purpose of illustration, example embodiments of the present disclosure are discussed in the type of RAID 5. However, it should be appreciated that the example embodiments of the present disclosure may be similarly applied to any other type of RAID.

In FIG. 2, according to the type of the RAID 5, each RAID block 210 includes five disk extents from different storage disks 142. As mentioned above, new RAID blocks 210 may be continuously allocated according to the needs of data writing, so that the capacity of the RAID system 130 is dynamically improved. Five allocated RAID blocks 210 (i.e., RAID block 0 to RAID block 5) are shown in FIG. 2. In FIG. 2, in each disk extent 202, "RAID block 0," "RAID block 1," "RAID block 2," "RAID block 3," "RAID block 4," or "RAID block 5" are used to mark corresponding RAID blocks that the disk extent is allocated. The disk extent 202 of each storage disk 142 that is not selected for use as a RAID block is regarded as a spare disk extent 202 and is marked as "spare."

In some embodiments, each storage disk 142 may also be reserved with one or more disk extents 202 (marked as "reserved") for data rebuilt in the event of a disk failure. For example, if a storage disk 142 fails, the disk extents 202 of the storage disk 142 are all marked as failed, producing effects to the RAID blocks 210 built based on these disk extents 202. The storage system 100 may start the rebuilt process, use the selected reserved disk extents 202 to replace the failed disk extents in the RAID block 210, and rebuild the data/information in the failed disk extents to the reserved disk extents 202. According to the rebuilt algorithm, the rebuilt process may be started within a period of time after the disk fails. The embodiments of the present disclosure are not limited in this regard.

Data Coupling

Taking FIG. 2 as an example, the set of storage disks forms a set of RAIDs including RAID block 0, RAID block 1, RAID block 2, RAID block 3, RAID block 4, and RAID block 5. The storage system 100 may further determine the degree of data coupling between any two among a plurality of storage disks (storage disks 142-1, 142-2, 142-3, 142-4, 142-5, and 142-6) according to the number of RAIDs associated with a pair of storage disks at the same time. For example, taking the storage disk 142-1 and the storage disk 142-2 in FIG. 2 as an example, the degree of data coupling between them may be determined as the number of RAIDs managed by the pair of storage disks at the same time, that is, the number (i.e., 4) of RAIDs (RAID block 0, RAID block 1, RAID block 2, and RAID block 3) in storage blocks in the pair of the storage disks.

Similarly, the storage system 100 may determine the degree of data coupling for each pair of storage disks in the set of storage disks 142 to obtain a coupling matrix (also referred to as a proximity matrix). For example, Table 1 shows an example coupling matrix determined by the storage system 100, in which the degree of data coupling of the storage disk itself is set to 0.

TABLE 1

|  | storage disk 0 | storage disk 1 | storage disk 2 | storage disk 3 | storage disk 4 | storage disk 5 | storage disk 6 |
|---|---|---|---|---|---|---|---|
| storage disk 0 | 0 | 35 | 36 | 35 | 35 | 35 | 34 |
| storage disk 1 | 35 | 0 | 35 | 35 | 35 | 35 | 35 |
| storage disk 2 | 36 | 35 | 0 | 35 | 35 | 35 | 34 |
| storage disk 3 | 35 | 35 | 35 | 0 | 35 | 35 | 34 |
| storage disk 4 | 35 | 35 | 35 | 35 | 0 | 35 | 34 |
| storage disk 5 | 35 | 35 | 35 | 35 | 35 | 0 | 37 |
| storage disk 6 | 34 | 35 | 34 | 34 | 34 | 37 | 0 |

As shown in the example coupling matrix of Table 1, each item in the table represents the degree of data coupling between a pair of storage disks. For example, the degree of data coupling between storage disk 0 and storage disk 1 is 35, and the degree of data coupling between storage disk 0 and storage disk 2 is 36. It should be appreciated that the higher the degree of data coupling, the stronger the data dependence between the two storage disks.

The coupling matrix may indicate whether the distribution of a set of RAIDs in the set of storage disks is even, and when the distribution is not even, it may trigger adjustment of at least one RAID to make the RAID distribution more even. This can improve the storage stability of the set of RAIDs, and effectively reduce the risk of storage disk failure.

Raid Across a Set of Storage Disks

As discussed above, the coupling matrix may indicate whether a set of RAIDs is evenly distributed in the set of storage disks. Generally speaking, the set of storage disks (also known as RRS (RAID RESILIENCY SET)) refers to a set of a fixed number of storage disks. When the RAID in the set of storage disks needs to be rebuilt, only the storage blocks in the set of storage disks can be used rather than other storage disks. However, in some cases, for example, when adding a new set of storage disks to the storage system, the storage disks that originally belonged to the same set of storage disks may be split into two different storage disks out of consideration of available capacity. This will cause one RAID to be distributed to two different sets of storage disks. In this case, it is difficult to effectively update the respective coupling matrix of different sets of storage disks with existing methods.

According to an embodiment of the present disclosure, a solution for storage management is provided. In this solution, first, a RAID associated with the first set of storage disks is determined, where the first portion of the storage blocks corresponding to the RAID are located in the first set of storage disks. A plurality of storage disks corresponding to the RAID are subsequently determined from the first set of storage disks, and a set of association degrees of the first set of storage disks can be updated to indicate data coupling between pairs of storage disks in the plurality of storage disks. Based on this manner, the embodiments of the present disclosure can more accurately indicate the data coupling of each storage disk pair in the set of storage disks.

Figure 3:
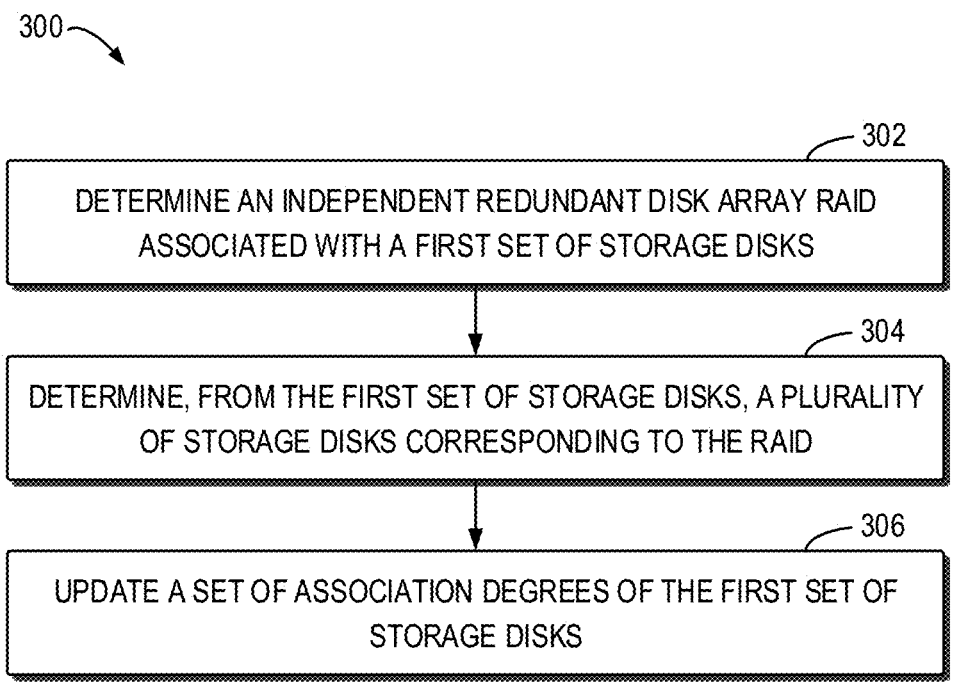
FIG. 3 illustrates a flowchart of a process of storage management according to an embodiment of the present disclosure.

The process of storage management according to an embodiment of the present disclosure will be described below with reference to FIG. 3. FIG. 3 illustrates a flowchart of a process 300 of storage management according to an embodiment of the present disclosure. The process 300 may be implemented by, for example, a management device for managing the storage system 100 shown in FIG. 1.

Figure 4A:
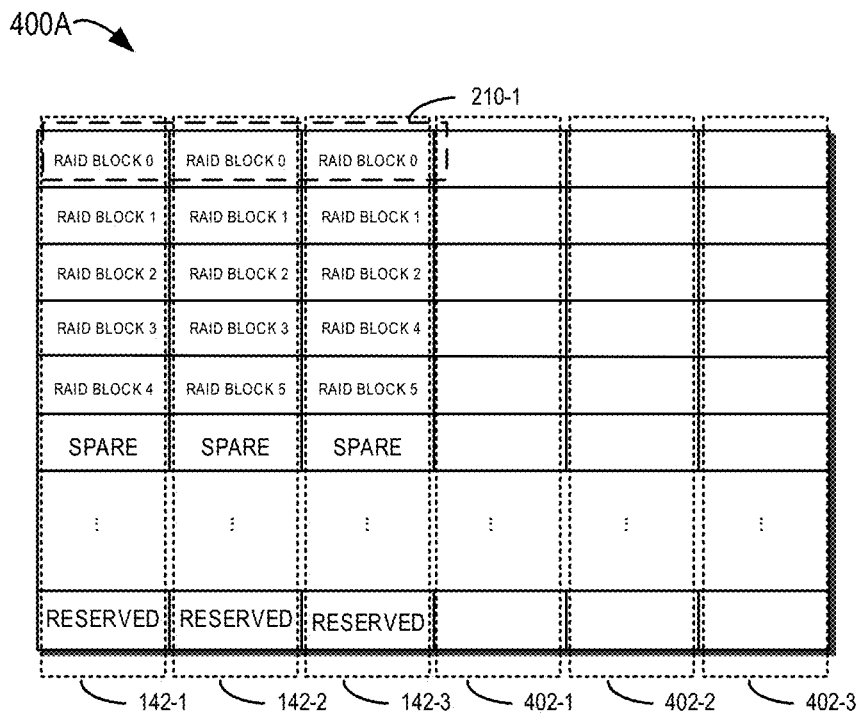
FIGS. 4A and 4B show an example set of storage disks after adding storage disks according to an embodiment of the present disclosure.
Figure 4B:
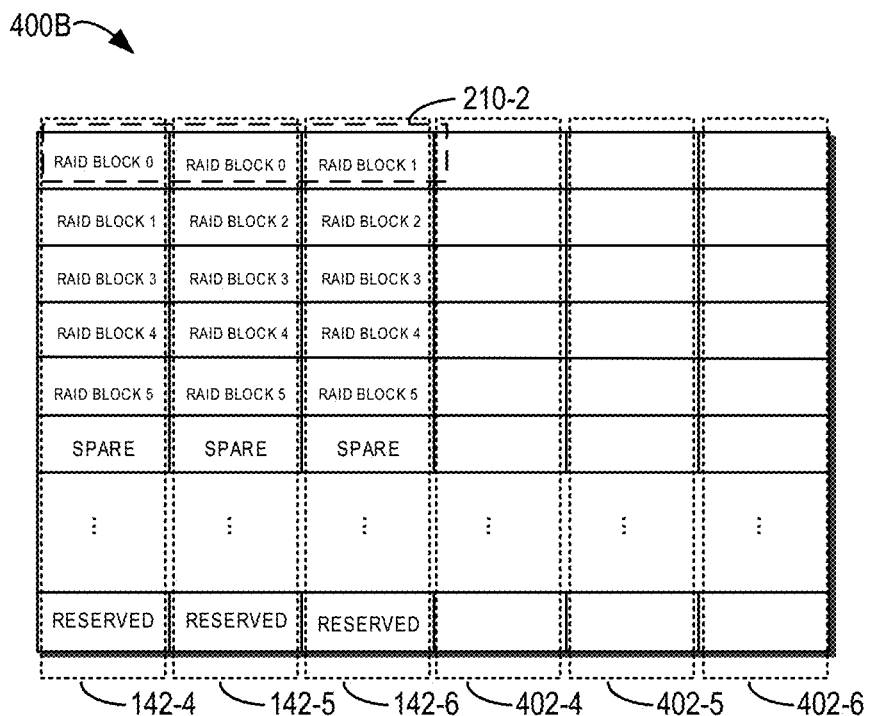

At block 302, the management device determines a RAID associated with the first set of storage disks, where the first portion of the storage blocks corresponding to the RAID is located in the first set of storage disks. Taking FIG. 2 as an example, when six new storage disks are added, the original set of storage disks (storage disk 142-1 to storage disk 142-6) is split into two different sets of storage disks. FIGS. 4A and 4B show example sets of storage disks 400A and 400B after adding storage disks according to an embodiment of the present disclosure.

As shown in FIGS. 4A and 4B, the set of storage disks 400A includes the original storage disk 142-1, the storage disk 142-2, and the storage disk 142-3, and the newly added storage disk 402-1, storage disk 402-2, and storage disk 402-3. The set of storage disks 400B includes the original storage disk 142-4, the storage disk 142-5, and the storage disk 142-6 and the newly added storage disk 402-4, storage disk 402-5, and storage disk 402-6. Taking the set of storage disks 400A of FIG. 4A as an example of the first set of storage disks, the management device may determine that the first portion 210-1 of the RAID 210 is located in the set of storage disks 400A and the second portion 210-2 of the RAID 210 is located in a different set of storage disks 400B.

At block 304, the management device determines, from the first set of storage disks, a plurality of storage disks corresponding to the RAID. In some embodiments, the management device may determine the plurality of storage disks by determining which storage disks the storage blocks corresponding to the RAID are included in. Specifically, taking FIG. 4A as an example, the management device may determine that the storage disks corresponding to the RAID 210 in the set of storage disks 400A include the storage disk 142-1, the storage disk 142-2, and the storage disk 142-3.

At block 306, the management device updates a set of association degrees of the first set of storage disks to indicate the data coupling between storage disks pairs in the plurality of storage disks. In some embodiments, regarding the RAID completely included in the first set of storage disks, the management device may determine the data coupling between the storage disk pairs according to a conventional method, which is not described in detail herein.

Regarding a RAID partially included in the first set of storage disks, the management device may only consider the data coupling between the storage disks corresponding to the first portion. For example, for the example of FIG. 4A, the management device may determine there is data coupling between storage disks pairs (the storage disk 142-1 and the storage disk 142-2, the storage disk 142-1 and the storage disk 142-3 and the storage disk 142-2 and the storage disk 142-3), without considering the data coupling between the storage disk 142-1 and the storage disk 142-4 located in a different set of storage disks. For example, the management device may add "1" to the data coupling degree of the storage disk pairs (the storage disk 142-1 and the storage disk 142-2, the storage disk 142-1 and the storage disk 142-3, and the storage disk 142-2 and the storage disk 142-3) via the coupling matrix in the set 400A of storage devices. Based on this way, the embodiments of the present disclosure can better manage a separate set of storage devices to reflect the degree of use balance within the set of storage devices.

The management device may determine the number of storage blocks associated with the RAID contained in one of the plurality of storage disks. Subsequently, the management device may update a set of association degrees based on the number. For example, for an 8D+1P type RAID, each associated storage disk needs to provide two storage blocks to build the RAID. In this case, the management device, for example, may add "two" to the degree of data coupling of storage disk pairs (the storage disk 142-1 and the storage disk 142-2, the storage disk 142-1 and the storage disk 142-3, and the storage disk 142-2 and the storage disk 142-3.

In some embodiments, in order for the same RAID to be maintained in the same set of storage disks, the management device may also allocate, in the first set of storage disks, the target storage blocks corresponding to the second portion, and cause the data in the second portion to be moved to the target storage blocks.

For example, for the examples of FIGS. 4A and 4B, the management device may allocate target storage blocks in the new storage disk 402-1, storage disk 402-2, and storage disk 402-3, and cause the data in the second portion 210-2 of the RAID 210 to be moved to the target storage blocks.

In some embodiments, the management device may also update the RAID to be associated with the target storage blocks, so that the storage blocks associated with the updated RAID are located in the same set of storage disks for management.

In some embodiments, the management device may also determine the target storage disk corresponding to the target storage blocks. Subsequently, the management device may update a set of association degrees to indicate the data coupling between the storage disk pairs in the plurality of storage disks and the target storage disk. For example, after the data in the second portion 210-2 is moved to the target storage blocks in the storage disk 402-1, the storage disk 402-2, and the storage disk 402-3, the management device may further determine there is data coupling between any pair of the storage disk 142-2, the storage disk 142-1, the storage disk 142-3, the storage disk 402-1, the storage disk 402-2, and the storage disk 402-3.

Figure 5:
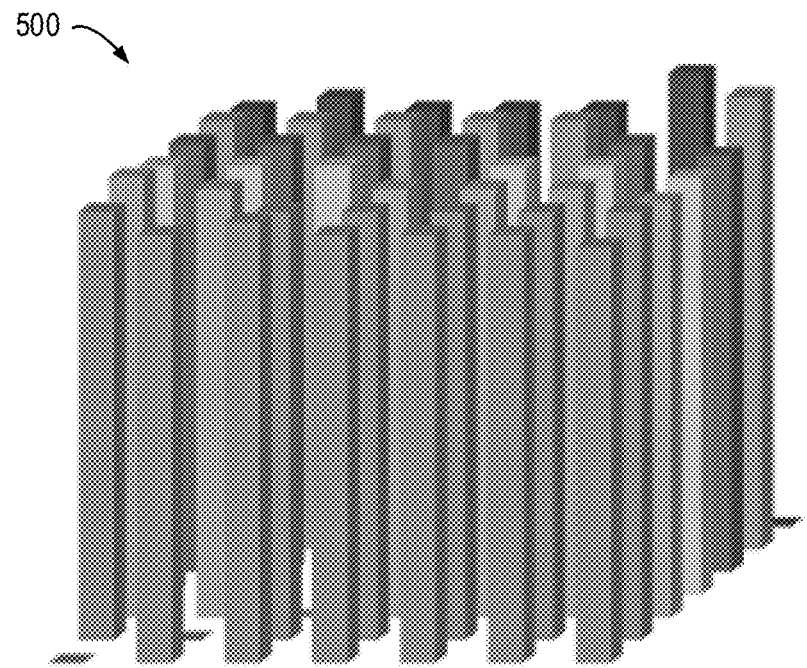
FIG. 5 illustrates an example graphical representation according to an embodiment of the present disclosure.

In some embodiments, the management device may also provide a graphical representation of the set of association degrees. For example, the storage system may also provide the set of association degrees in the form of a matrix as shown in the table, so that administrative staff can intuitively understand whether the distribution is even. Alternatively, the management device may also more intuitively present the distribution equilibrium level of the group of RAIDs through a chart. For example, FIG. 5 shows an example graphical representation 500 according to an embodiment of the present disclosure. With the graphical representation, the embodiments of the present disclosure can enable administrative staff to more intuitively understand which storage disks are unevenly distributed and determine whether RAID reallocation needs to be initiated.

Figure 6:
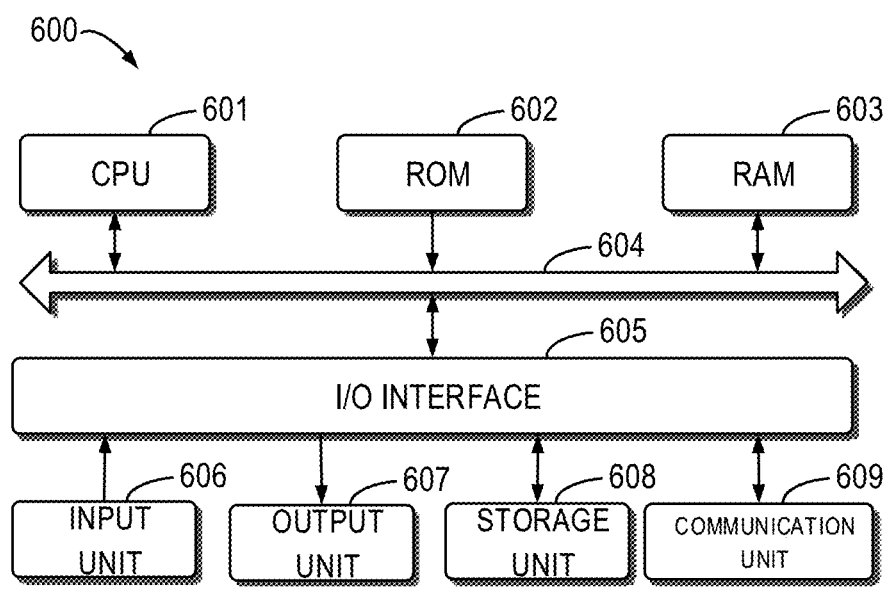
FIG. 6 illustrates a schematic block diagram of an example device for implementing embodiments of the present disclosure.

FIG. 6 illustrates a schematic block diagram of an example device 600 for implementing embodiments of the present disclosure. For example, the storage management device 100 according to the embodiment of the present disclosure can be implemented by the device 600. As shown, the device 600 includes a central processing unit (CPU) 601, which can execute various suitable actions and processing based on the computer program instructions stored in a read-only memory (ROM) 602 or computer program instructions loaded in a random-access memory (RAM) 603 from a storage unit 608. The RAM 603 may also store all kinds of programs and data required by the operations of the device 600. The CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, for example, a keyboard, a mouse, and the like; an output unit 607, for example, various kinds of displays and loudspeakers, and the like; a storage unit 608, such as a magnetic disk and an optical disk, and the like; and a communication unit 609, such as a network card, a modem, a wireless transceiver, and the like. The communication unit 609 allows the device 600 to exchange information/data with other devices via the computer network, such as Internet, and/or various telecommunication networks.

The above described process and processing, for example, the method 300, can also be performed by the processing unit 601. For example, in some embodiments, the method 300 may be implemented as a computer software program being tangibly included in the machine-readable medium, for example, the storage unit 608. In some embodiments, the computer program may be partially or fully loaded and/or mounted to the device 600 via the ROM 602 and/or communication unit 609. When the computer program is loaded to the RAM 603 and executed by the CPU 601, one or more steps of the above described method 500 and/or 1300 can be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible device that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combination of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, a mechanical coding device, a punched card stored with instructions thereon, or a projection in a slot, and any appropriate combination of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include copper-transmitted cables, optical fiber transmissions, wireless transmissions, routers, firewalls, switches, network gate computers and/or edge servers. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combination of one or more programming languages, where the programming languages consist of object-oriented programming languages, e.g., Smalltalk, C++, and so on, and conventional procedural programming languages, such as "C" language or similar programming languages. The computer-readable program instructions may be implemented fully on a user computer, partially on the user computer, as an independent software package, partially on the user computer and partially on a remote computer, or completely on the remote computer or a server. In the case where a remote computer is involved, the remote computer may be connected to the user computer via any type of network, including a local area network (LAN) and a wide area network (WAN), or to the external computer (e.g., connected via Internet using an Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described herein with reference to a flow chart and/or block diagram of method, device (system) and computer program products according to embodiments of the present disclosure. It should be appreciated that each block of the flow chart and/or block diagram and the combination of various blocks in the flow chart and/or block diagram can be implemented by computer-readable program instructions.

The computer-readable program instructions may be provided to the processing unit of a general-purpose computer, dedicated computer or other programmable data processing devices to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architectures, functions and operations that may be implemented by a system, a method and a computer program product according to multiple implementations of the present disclosure. In this regard, each block in the flow chart or block diagram can represent a module, a portion of program segment or code, where the module and the portion of program segment or code include one or more executable instructions for performing stipulated logic functions. In some alternative implementations, it should be appreciated that the functions indicated in the block may also take place in an order different from the one indicated in the drawings. For example, two successive blocks may be in fact executed in parallel or sometimes in a reverse order depending on the involved functions. It should also be appreciated that each block in the block diagram and/or flow chart and combinations of the blocks in the block diagram and/or flow chart may be implemented by a hardware-based system exclusively for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method for storage management, comprising:
    adding storage disks to a storage system already having multiple storage disks;
    splitting the multiple storage disks and the added storage disks between a first set of storage disks and a second set of storage disks different from the first set of storage disks;
    determining an independent redundant disk array RAID associated with the first set of storage disks, a first portion of storage blocks corresponding to the RAID being located in the first set of storage disks and a second portion of storage blocks corresponding to the RAID being located in the second set of storage disks;
    determining, from the first set of storage disks, a plurality of storage disks corresponding to the RAID; and
    updating a set of association degrees of the first set of storage disks to indicate data coupling between storage disk pair in the plurality of storage disks, said updating based on pairs of storage disks in the first set of storage disks but not based on any storage disks in the second set of storage disks.

2. The method of claim 1, further comprising the second set of storage disks maintaining a set of association degrees to indicate data coupling between storage disk pairs in a plurality of storage disks in the second set of storage disks.

3. The method of claim 2, further comprising:
    allocating, in the first set of storage disks, target storage blocks corresponding to the second portion;
    causing data in the second portion to be moved to the target storage blocks; and
    updating the RAID to associate with the target storage blocks.

4. The method of claim 3, further comprising:
    determining a target storage disk corresponding to the target storage blocks; and
    updating the set of association degrees to indicate data coupling between storage disk pair in the plurality of storage disks and the target storage disk.

5. The method of claim 1, wherein updating the set of association degrees comprises:
    determining a number of storage blocks associated with the RAID contained in one of the plurality of storage disks; and
    updating the set of association degrees based on the number.

6. The method of claim 1, wherein said updating, for each pair of storage disks in the first set of storage disks, is based on a number of storage blocks that the respective pair of storage disks has in common.

7. The method of claim 6, wherein a particular pair of storage disks includes a first storage disk in the first plurality of storage disks and a second storage disk in the second plurality of storage disks, the first storage disk and the second storage disk having at least one storage block in common but contributing no change to the set of association degrees of the first set of storage disks.

8. An electronic device, comprising:
    at least one processing unit;
    at least one memory coupled to the at least one processing unit and storing instructions for execution by the at least one processing unit, the instructions, when executed by the at least one processing unit, causing the device to perform acts comprising:
        adding storage disks to a storage system already having multiple storage disks;
        splitting the multiple storage disks and the added storage disks between a first set of storage disks and a second set of storage disks different from the first set of storage disks;
        determining an independent redundant disk array RAID associated with the first set of storage disks, a first portion of storage blocks corresponding to the RAID being located in the first set of storage disks and a second portion of storage blocks corresponding to the RAID being located in the second set of storage disks;
        determining, from the first set of storage disks, a plurality of storage disks corresponding to the RAID; and
        updating a set of association degrees of the first set of storage disks to indicate data coupling between storage disk pair in the plurality of storage disks, said updating based on pairs of storage disks in the first set of storage disks but not based on any storage disks in the second set of storage disks.

9. The device of claim 8, wherein the acts further comprise the second set of storage disks maintaining a set of association degrees to indicate data coupling between storage disk pair in a plurality of storage disks in the second set of storage disks.

10. The device of claim 9, further comprising:
- allocating, in the first set of storage disks, target storage blocks corresponding to the second portion;
- causing data in the second portion to be moved to the target storage blocks; and
- updating the RAID to associate with the target storage blocks.

11. The device of claim 10, further comprising:
- determining a target storage disk corresponding to the target storage blocks; and
- updating the set of association degrees to indicate data coupling between storage disk pair in the plurality of storage disks and the target storage disk.

12. The device of claim 8, wherein updating the set of association degrees comprises:
- determining a number of storage blocks associated with the RAID contained in one of the plurality of storage disks; and
- updating the set of association degrees based on the number.

13. A computer program product being tangibly stored on a non-transitory computer-readable medium and comprising machine-executable instructions which, when executed by a device, cause the device to perform the acts, comprising:
- adding storage disks to a storage system already having multiple storage disks;
- splitting the multiple storage disks and the added storage disks between a first set of storage disks and a second set of storage disks different from the first set of storage disks;
- determining an independent redundant disk array RAID associated with the first set of storage disks, a first portion of storage blocks corresponding to the RAID being located in the first set of storage disks and a second portion of storage blocks corresponding to the RAID being located in the second set of storage disks;
- determining, from the first set of storage disks, a plurality of storage disks corresponding to the RAID; and
- updating a set of association degrees of the first set of storage disks to indicate data coupling between storage disk pair in the plurality of storage disks, said updating based on pairs of storage disks in the first set of storage disks but not based on any storage disks in the second set of storage disks.

14. The computer program product of claim 13, wherein the acts further comprise the second set of storage disks maintaining a set of association degrees to indicate data coupling between storage disk pair in a plurality of storage disks in the second set of storage disks.

15. The computer program product of claim 14, further comprising:
- allocating, in the first set of storage disks, target storage blocks corresponding to the second portion;
- causing data in the second portion to be moved to the target storage blocks; and
- updating the RAID to associate with the target storage blocks.

16. The computer program product of claim 15, further comprising:
- determining a target storage disk corresponding to the target storage blocks; and
- updating the set of association degrees to indicate data coupling between storage disk pair in the plurality of storage disks and the target storage disk.

17. The computer program product of claim 13, wherein updating the set of association degrees comprises:
- determining a number of storage blocks associated with the RAID contained in one of the plurality of storage disks; and
- updating the set of association degrees based on the number.

\* \* \* \* \*